United States Patent [19]

Julian et al.

[11] Patent Number: 5,061,173
[45] Date of Patent: Oct. 29, 1991

[54] INJECTION-BLOW MOLDING APPARATUS INCLUDING CIRCUMFERENTIALLY CONTINUOUS INJECTION MOLDS, BLOW MOLDS AND SHOULDER FORMING SLEEVES

[75] Inventors: Randall K. Julian; Edward Luker, both of Evansville, Ind.

[73] Assignee: Sunbeam Plastics Corporation, Evansville, Ind.

[21] Appl. No.: 439,259

[22] Filed: Nov. 20, 1989

[51] Int. Cl.$^5$ ............................................. B29C 49/06
[52] U.S. Cl. .................................... 425/525; 264/512; 264/526; 425/529; 425/533; 425/534
[58] Field of Search ............... 264/536, 512, 528, 526; 425/534, 137, 163, 167, 156, 526.1, 533, 525, 529, 522

[56] References Cited

U.S. PATENT DOCUMENTS

| | | | |
|---|---|---|---|
| Re. 26,265 | 9/1967 | Farkas | 425/167 |
| 2,331,687 | 10/1943 | Hobson | 264/536 |
| 2,853,736 | 9/1958 | Gussoni | 425/534 |
| 2,966,702 | 1/1961 | Soubier | 425/525 |
| 3,116,516 | 1/1964 | Moslo | 425/137 |
| 3,137,748 | 6/1964 | Makowski | 264/97 |
| 3,183,552 | 5/1965 | Farkas | 425/163 |
| 3,390,427 | 7/1968 | Ruckberg | 425/156 |
| 3,492,690 | 2/1970 | Goldring et al. | 425/163 |
| 3,664,798 | 5/1972 | Moslo | 425/326 |
| 3,685,943 | 8/1972 | Fischer | 425/326 |
| 3,776,991 | 12/1973 | Marcus | 264/89 |
| 3,809,517 | 5/1974 | Schneider | 425/242 |
| 3,870,448 | 3/1975 | Majors et al. | 425/242 |
| 3,941,539 | 3/1976 | Saumsiegle et al. | 425/242 |
| 3,990,826 | 11/1976 | Marcus | 425/242 |
| 4,039,644 | 8/1977 | Saumsiegle et al. | 264/97 |
| 4,063,868 | 12/1977 | Piotrowski | 425/533 |
| 4,067,944 | 1/1978 | Valyi | 264/89 |
| 4,076,484 | 2/1978 | Armour et al. | 425/525 |
| 4,265,852 | 5/1981 | Saver | 264/512 |
| 4,473,515 | 9/1984 | Ryder | 264/28 |
| 4,540,543 | 9/1985 | Thomas et al. | 264/526 |
| 4,731,011 | 3/1988 | Nakamura et al. | 425/529 |
| 4,732,557 | 3/1988 | Aoki | 425/522 |

FOREIGN PATENT DOCUMENTS 1174835 12/1969 United Kingdom .
2149341A 10/1984 United Kingdom .

Primary Examiner—Timothy Heitbrink
Attorney, Agent, or Firm—Gifford, Groh, Sprinkle, Patmore and Anderson

[57] ABSTRACT

Injection-blow molding apparatus in which maximum mold density is obtained by alternate arrangement of circumferentially continuous blow molds and injection molds, with axial mold closure being obtained by neck forming and shoulder forming sleeves concentrically located around the cores which are reciprocated into and out of the molds.

36 Claims, 7 Drawing Sheets

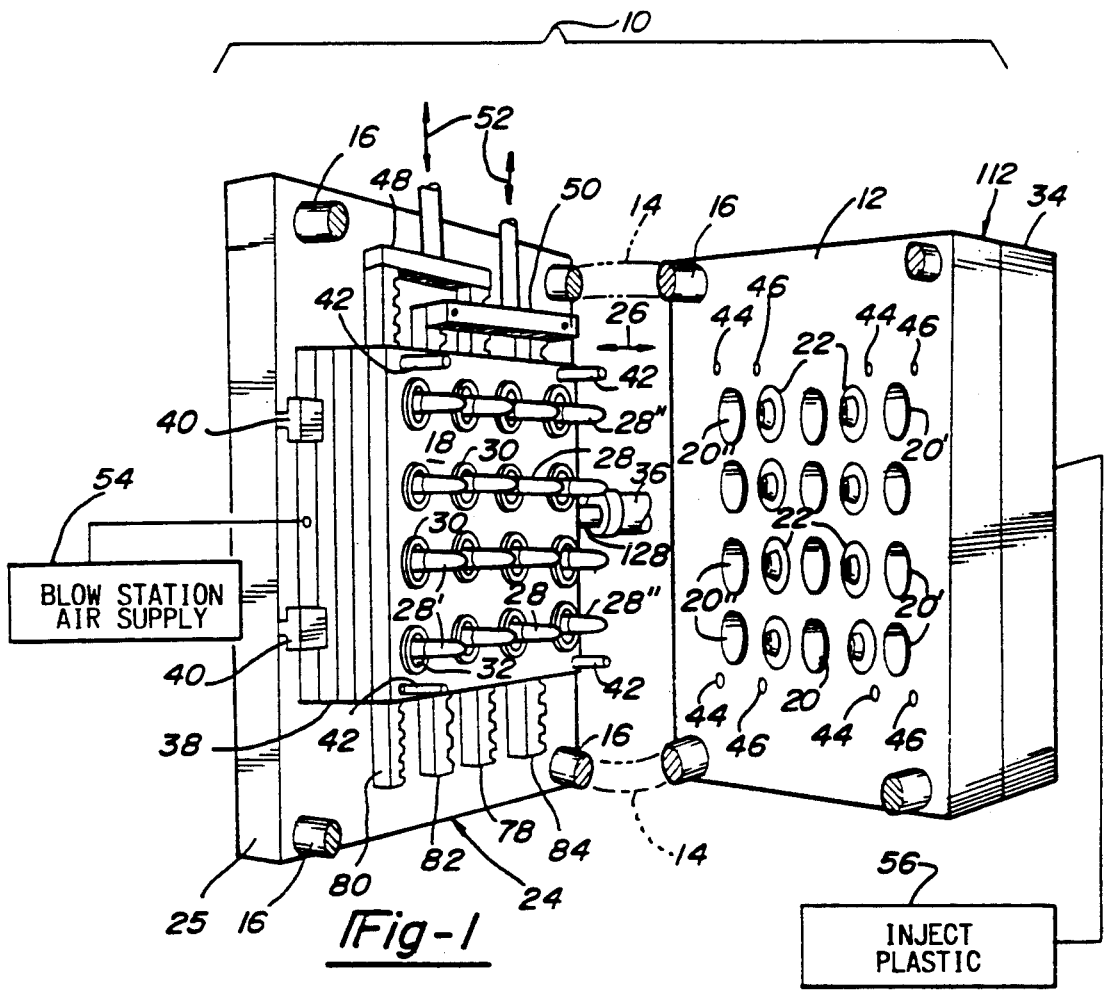
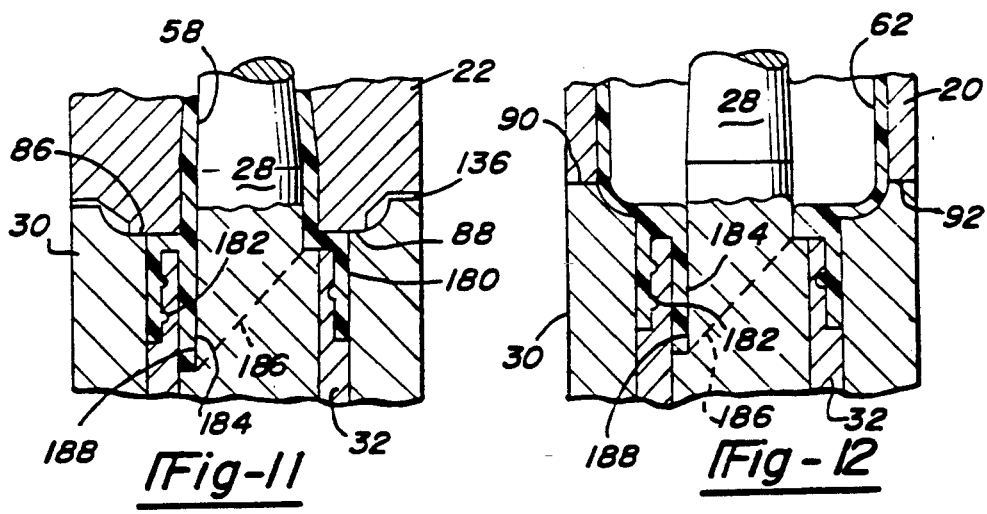

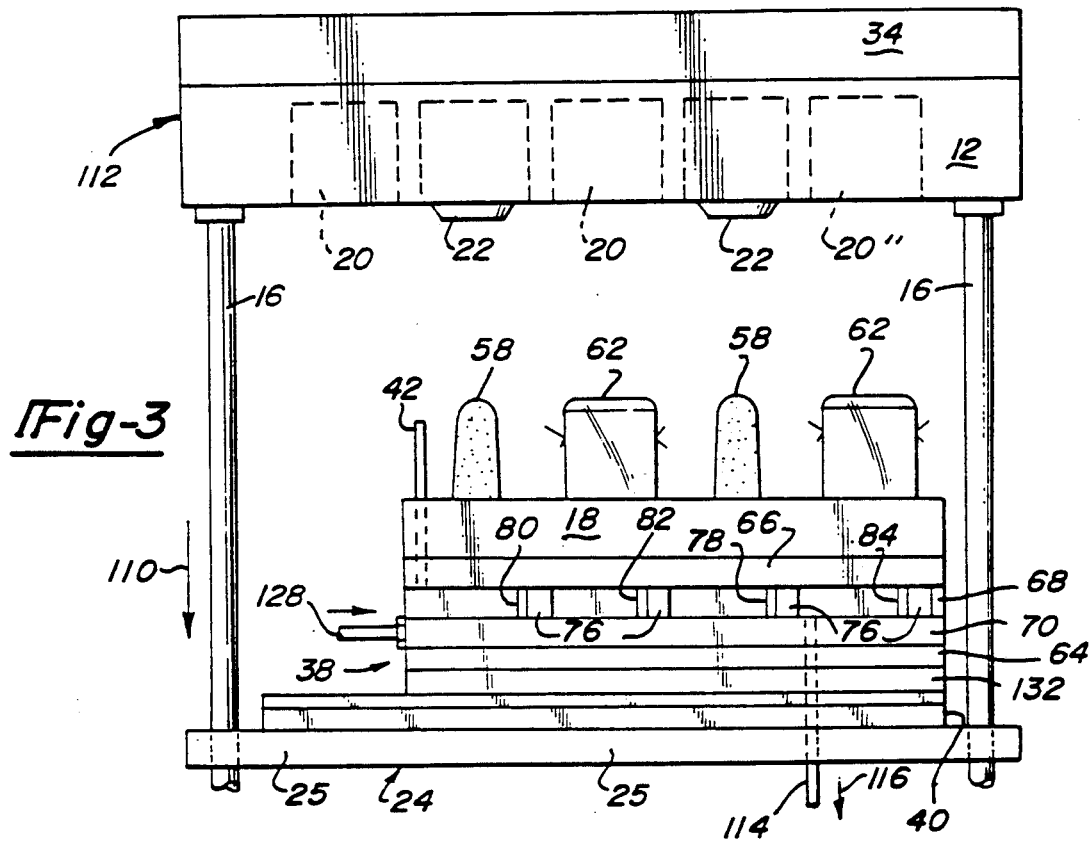
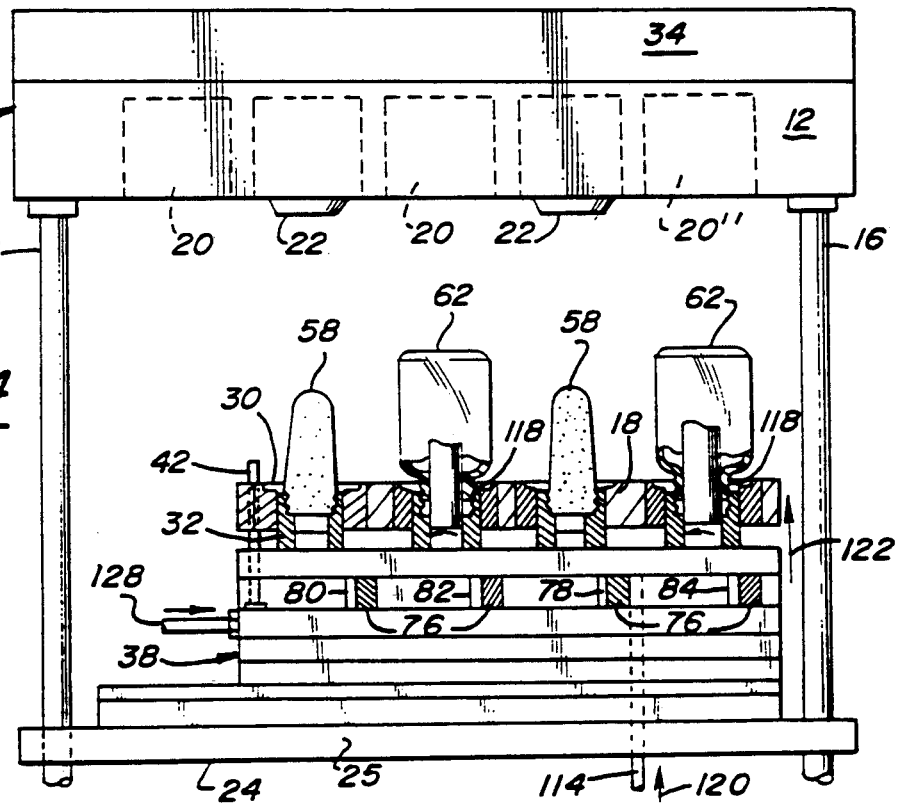

INJECTION-BLOW MOLDING APPARATUS INCLUDING CIRCUMFERENTIALLY CONTINUOUS INJECTION MOLDS, BLOW MOLDS AND SHOULDER FORMING SLEEVES

This invention relates to a method and apparatus for molding containers, and more particularly to a method and apparatus for molding plastic containers having restricted necks by injection-blow molding.

A container with a restricted neck is defined as a container having a larger body and a smaller neck portion terminating in the container opening through which the contents of the container are dispensed. A shoulder performs the transition between the larger body portion and the smaller neck portion.

Containers with restricted necks are commonly produced in injection-blow molding machines where the neck is formed on a pre-form or parison in an injection mold and the finished container with its intermediate shoulder is formed in a blow mold. The parison is formed around a core in the injection mold, and the core carries the parison to the blow mold. Typically, both the injection mold and the blow mold open radially for introduction of the cores to the molds and for removal of the parison with its formed neck from the injection mold and the finished container from the blow mold.

In some instances, a separate neck mold is used; for example, when more accurate threads are desired on the container neck finish, the use of a separate neck mold allows the parison to be transferred on the core with the neck mold to the blow mold station. This generally produces a better thread than one formed in an injection mold which may be unsupported or put into a slightly different size mold cavity in the blow mold to account for temperature differences and the like. With a separate neck mold, the injection mold can be one piece, that is, the mold does not have to open radially if the core is reciprocated into and out of the mold. However, the blow molds still open radially to permit ejection of the finished container.

The present invention is directed to optimization of molding machine space or to the arrangement of the injection and blow mold cavities with minimum spacing so that a maximum number of parts may be molded at a given time in a given confined space. For example, this invention contemplates an arrangement capable of molding 36 finished containers or more in one molding cycle. Thirty six containers can be produced in an arrangement employing 36 blow molds and 36 injection molds with 72 cores. Parisons formed on the cores in the injection molds are moved into the blow molds for blowing the finished containers while the cores from which finished containers have been removed are moved into the injection molds to form new parisons.

A great amount of space is required for radially opening the injection molds and the blow molds. The present invention utilizes one-piece molds or injection and blow molds which open axially at one end. The elimination of radial mold opening not only permits spacing optimization between adjacent mold cavities, but it allows heat transfer to the mold cavities to be optimized. In radially opening molds, the heat transfer tubes must be arranged perpendicular to the mold axes which necessarily causes uneven heating or cooling. With circumferentially continuous or one-piece molds, the heat transfer passages can be made concentric with the core axes so as to provide a uniform temperature to the parisons and uniform cooling of the blow molded container. This provides a more uniform product while also reducing cycle time.

The injection-blow molding apparatus of our invention uses a series of at least one one-piece circumferentially continuous blow mold and at least one adjacent one-piece circumferentially continuous preform injection mold. At least one core is mounted for relative reciprocating movement between and into and out of the injection and blow molds. A neck and shoulder forming sleeve is concentrically located around each of the cores.

Positioning means in the form of hydraulic cylinders and associated mechanisms are used for locating the cores and the sleeves in operative position relative to the molds to close the molds and to form a parison in the injection mold and blow mold a container from a previously formed parison on one of the cores in one of the blow molds. The finished container is ejected from the blow mold, core, and neck and shoulder forming sleeves in a direction parallel to the core, and the core and sleeves are moved in an operative position relative to the injection mold to form another parison while a container is being blown in one of the blow molds. The positioning means moves either the series of molds or the cores and sleeves to accomplish relative movement of the cores into and out of the molds. Preferably, the molds remain stationary with the injection equipment of the machine, and the cores with their surrounding sleeves are caused to reciprocate into and out of the molds. The lateral movement or movement transverse to the mold and core axis is accomplished by moving the cores to transfer each core alternately between alignment with an injection mold and alignment with a blow mold.

In accomplishing an optimum mold cavity density, for example in the previously mentioned machine to produce 36 containers per cycle, one-piece circumferentially continuous pre-form injection molds are alternatively arranged with adjacent one-piece circumferentially continuous blow molds in a plurality of vertically spaced and aligned horizontal rows. Each horizontal row begins and ends with a blow mold so that there is one more blow mold in each horizontal row than injection molds. In the 36 container machine, this can take the form of 12 vertically spaced horizontal rows of 4 blow molds and 3 injections molds alternately arranged. The cores are arranged in vertically spaced horizontal rows aligned with and mounted for relative movement into and out of the injection and blow molds. For the 36 container machine this would require 12 vertically spaced horizontal rows containing 6 cores each. As with the previous example, the neck and shoulder forming sleeves are concentrically located around each of the cores, and the positioning means reciprocates the cores into and out of the injection and blow molds and shuttles or horizontally moves the cores alternately to the right and left to move the cores between adjacent injection and blow molds.

Such mold cavity density optimization can be accomplished in a like manner in a rotary injection-blow molding machine, in which, for example, the cores with their associated concentrically located neck and shoulder forming sleeves are rotated in one direction to move alternately into alignment with injection and blow molds arranged in an annular array to receive the cores by axial movement into the molds. Such axial movement brings the neck and shoulder forming sleeves into sealing engagement with the molds, closing them for injection of parisons in the injection molds and blowing finished containers in the blow molds. It will be appreciated that with a rotary array there will be an equal number of alternately arranged blow molds and injection molds, and there can be a number of spaced arrays arranged around the axis of rotation of the cores.

Thus an important feature of this invention or a primary embodiment is a die set which can be inserted into existing injection-blow molding machines. The machine of necessity must permit relative reciprocation between the cores with associated neck and shoulder forming sleeves and the molds. In a preferred embodiment the array of molds constitute the stationary portion of the die set and the cores with their concentrically circumposed neck and shoulder forming sleeves constitutes the moving portion of the die set. The cores are reciprocated into and out of the molds and shuttled or moved transversely between adjacent injection and blow molds.

The neck and shoulder forming sleeves can be configured to form a neck with closure attachment means on the parison in the injection mold. The closure attachment means can take the form of threads on the container neck, and the apparatus can be configured so that the neck and shoulder forming sleeve is unthreaded from the neck of the blow molded container during ejection of the container.

The neck and shoulder forming sleeves are configured to form containers with shoulders in the blow molds.

In a preferred form, each of the neck and shoulder forming sleeves has an inner annular clamping surface which is clamped against the injection mold when the core and sleeve is in operative position relative to the injection mold and the sleeve has an outer annular clamping surface which is clamped against one of the blow molds when the core and sleeve is in operative position relative to the blow mold.

In another preferred embodiment, the neck and shoulder forming sleeve is configured to form a neck with closure attachment means and an outside container shoulder portion on the parison in the injection mold and the container is blown with this outside shoulder portion acting as a molding surface when the container is being formed in the blow mold. In this case where an outside shoulder portion is formed in the injection mold, a single annular clamping surface on the neck and shoulder forming sleeve clamps against the injection mold in the injection stage and clamps against the blow mold in the blowing stage.

The neck and shoulder forming sleeve means can be a single, radially continuous sleeve which is located around the core. This single sleeve can also be a unitary circumferentially continuous sleeve. This one-piece structure would be used, for example, where a cylindrical bottle is being formed with a symmetrical shoulder and an externally threaded neck.

Likewise, the neck and shoulder forming sleeve can comprise two elements, a neck forming sleeve which is concentrically located around the core and a separate shoulder forming sleeve which is concentrically located around the neck forming sleeve.

With the separate sleeves, in one embodiment each of the neck forming sleeves has an annular clamping surface which is clamped against the injection mold when the core and sleeves are in operative position relative to the injection mold, and each of the shoulder forming sleeves has an annular clamping surface which is clamped against the blow mold when the core and the sleeves are in operative position relative to the blow mold.

In the embodiment where an outside shoulder portion is formed in the injection mold, the shoulder forming sleeve has a single annular clamping surface which is clamped against the injection mold when the core and sleeves are in operative position relative to the injection mold and is clamped against the blow mold when the core and sleeves are in operative position relative to a blow mold.

With separate neck forming sleeves and shoulder forming sleeves they can be configured to mold a container neck with closure attachment means and a radially offset structure between the neck forming sleeve and the shoulder forming sleeve. This can take the form of an externally threaded neck with the radially offset structure being a child resistant locking stop or a tamper indicating frangible web structure. Similarly, the attachment means and radially offset structure can be in the form of a central pour spout with a concentric internally threaded neck forming a drain-back type of container.

With separate neck forming sleeves and shoulder forming sleeves, the shoulder forming sleeve will be circumferentially continuous so that no axial parting line will appear on the shoulder of the container. The shoulder forming sleeve also acts as an ejector element in ejecting the finished container off the core after the container has been removed from the blow mold.

In most instances, the neck forming sleeve would be circumferentially continuous. This permits the closure attachment means to be formed as accurate external threads without axial parting lines. However, with a circumferentially continuous sleeve, an unthreading mechanism must be incorporated in the machine as set forth in one of the preferred embodiments.

In other instances, the neck forming sleeve can include two or more contiguous annular sectors so that during the ejection stage, the sectors can be radially opened to release the closure attachment means. Multiple sector structure can be used when the closure attachment means is being formed as a circumferential snap bead which coacts with a similar bead on a closure, or where less precise threads can be used. Preferably at least three or four sectors are used to minimize the amount of opening necessary to release the sleeve from the container neck.

The injection-blow molding method of the present invention involves the step of optimizing the mold cavity density by locating one-piece circumferentially continuous blow molds and one-piece circumferentially continuous injection molds in adjacent cavities formed in horizontal rows in a mold cavity plate.

BRIEF DESCRIPTION OF THE DRAWINGS

The preferred embodiments of the invention are illustrated in the drawing in which:

FIG. 1 is a perspective view of the injection-blow molding apparatus of this invention with the normally vertically oriented mold cavity plate and associated runner plate being swung open for illustration only relative to a normally vertically oriented core mounting plate and associated neck forming sleeve mounting and operating plates and a shoulder forming sleeve mounting plate to reveal the operative relationship of the molding components of the machine exemplified by four vertically spaced horizontal rows of five mold cavities alternately containing one of three blow molds and one of two injection molds and opposed cores with the neck and shoulder forming sleeves.

FIG. 3 is a top view of the injection-blow molding apparatus of FIGS. 1 and 2, similar to FIG. 2, but omitting details and showing the injection-blow molding apparatus in its fully open position with the formed parisons and blown containers having been stripped or removed from their respective mold cavities and being retained on their respective cores, partially within the shoulder forming sleeve plate and neck forming sleeve plate;

FIG. 4 is a top view similar to FIG. 3 but showing the necks of the blown containers being unthreaded from their respective neck forming sleeves with the containers advanced a like amount toward the mold cavity plate, the shoulder forming plate with the separate shoulder forming sleeves and the protruding portion of neck forming sleeves are shown in section along with a portion of the blown bottle neck for greater clarity;

FIG. 11 is a partial top sectional view of an injection mold showing the use of a separate neck forming sleeve and shoulder forming sleeve configured to mold a container neck with closure attachment means and a radially offset structure in the form of a drain back neck configuration with a central pouring spout and internal neck threads;

FIG. 12 is a partial top sectional view of a blow mold showing the completion of the container with its shoulder from the parison formed in the injection mold shown in FIG. 11;

DETAILED DESCRIPTION OF THE INVENTION

Figure 2:
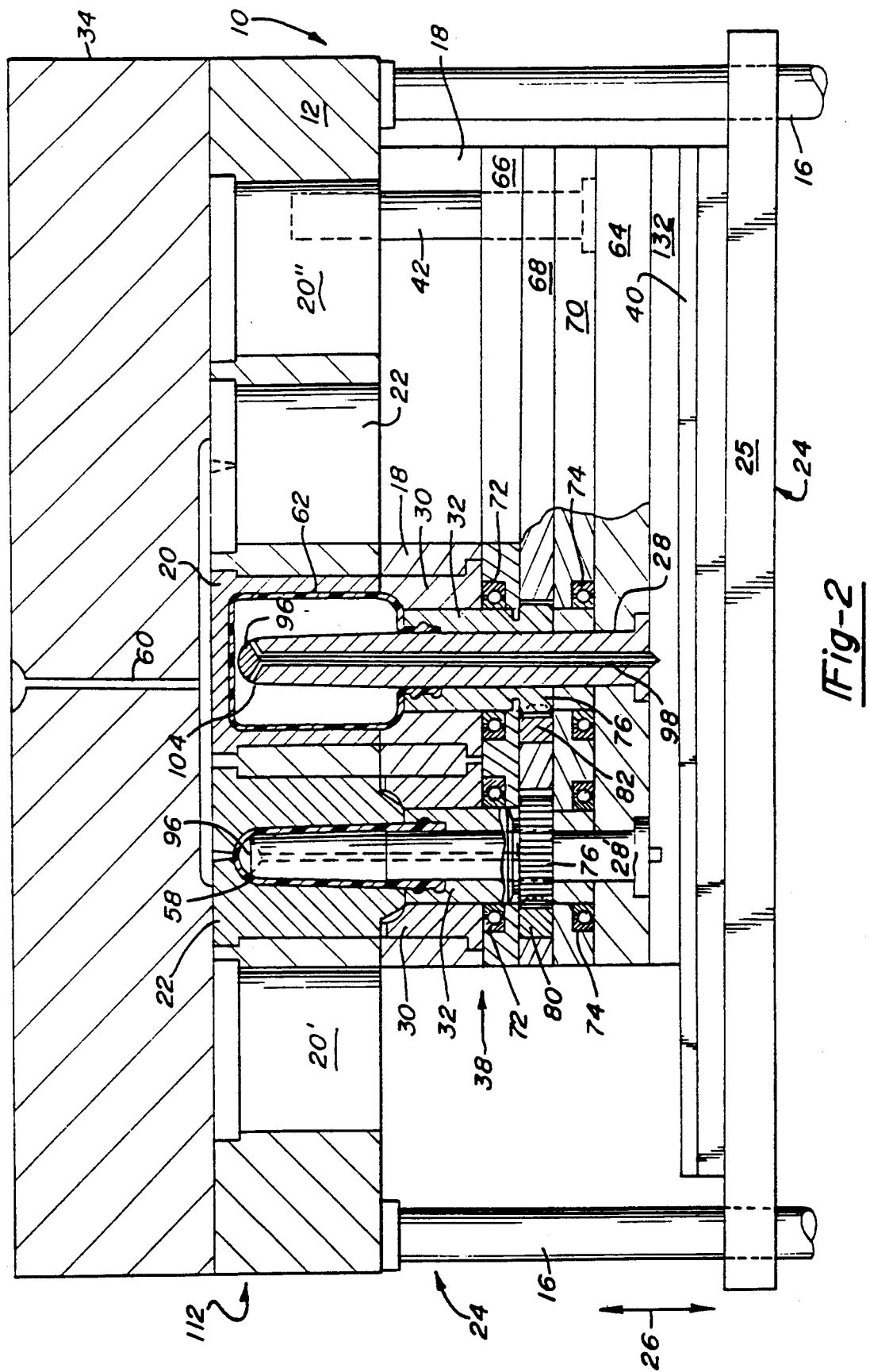
FIG. 2 is a cross-sectional top view of the injection-blow molding apparatus of this invention showing a horizontal row of mold cavities with the details of one injection and one blowing station with the molds closed and the cores fully inserted into the molds with a shoulder forming sleeve plate in abutment with the mold cavity plate in position for injection molding parisons and blow molding finished containers.

Referring to FIG. 1, the injection-blow molding apparatus 10 of the invention is shown in perspective with its mold cavity plate 12 swung open along lines 14 of guide posts 16 to show some of the details of the mold cavities and cores, sometimes referred to as core pins or core rods, and sleeves projecting from shoulder forming sleeve plate 18 which in its normal position is parallel to and opposing mold cavity plate 12. Mold cavity plate 12 is shown for illustration purposes as having 4 vertically spaced horizontal rows of 5 mold cavities in each row.

Each horizontal row contains a blow mold 20 at each end with injection molds 22 being located between an end blow mold 20 and central blow mold 20. The movable core and sleeve plate assembly or, simply, the movable platen assembly 24 is vertically aligned with the mold cavity plate 12 so that when the platen assembly 24 is reciprocated in the direction of arrow 26 on guide posts 16, the cores 28 will move into and out of aligned blow mold cavities 20 and injection mold cavities 22. As the platen assembly 24 is moved toward the cavity plate 12, the faces of shoulder forming sleeves 30 and the faces of neck forming sleeves 32 will seal against the respective blow molds 20 and injection molds 22, as will be more fully explained, so that the molding portion of a machine cycle can be commenced.

The illustrated embodiments of the injection-blow molding apparatus 10 of the invention includes the die set in which the cavity plate 12 and a runner plate 34 comprise the stationary plate or platen assembly 112 mounted to the stationary platen of the injection-blow molding machine. The core and sleeve plate assembly 24 or movable platen assembly 24 constitutes the moving portion of the die set which would be mounted to a reciprocating platen by mounting plate 25 to move the assembly towards and away from the stationary cavity plate on guideposts 16. The movable assembly 24 has various components causing movements and other functions. For example, hydraulic cylinder 36 performs a transverse shuttling motion for movement of plate assembly 38 along ways 40 to alternately position the cores between the blow molds 20 and the injection molds 22. Shoulder forming sleeve plate 18 is caused to move independently of the rest of the plates, of plate assembly 38 towards and away from the cavity plate 12 along guide rods 42 as shown in FIGS. 3-6 to perform a stripping or ejecting function for the finished containers as will be more specifically explained. Guide rods 42 alternately engage sockets 44 or 46 in cavity plate 12 depending upon the position of the shuttling plate assembly 38 as end row cores 28' engage blow molds 20' or end row cores 28" engage end row blow molds 20". When the containers are being formed with a threaded neck, one of alternate rack assemblies 48 and 50 is reciprocated in a direction of arrows 52 to effect rotation and unthreading of the neck forming sleeves 32 associated with the finished blown containers 62. Blow air and plastic is supplied to the injection-blow molding apparatus 10 from sources 54 and 56 in a manner conventional to molding machines.

Figure 7:
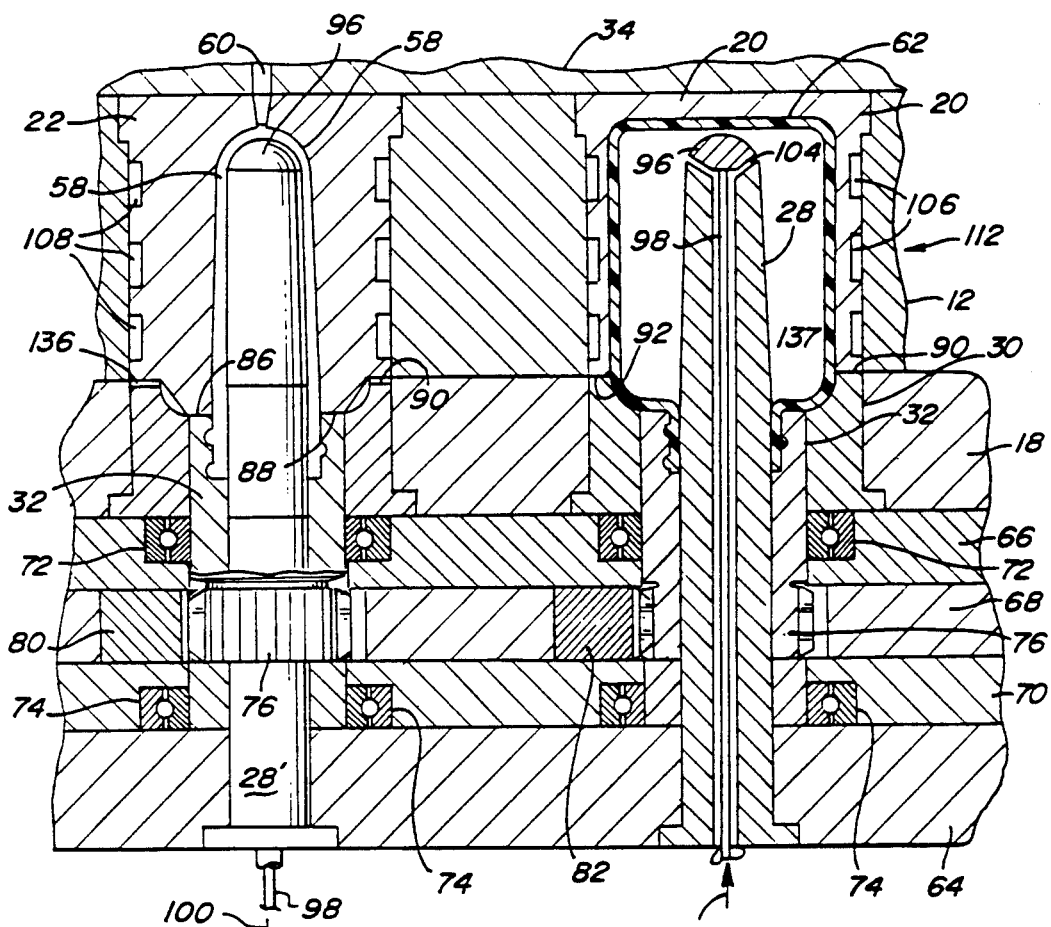
FIG. 7 is a partial top cross-sectional view similar to FIG. 2 but showing a single injection molding station and adjacent blow molding station on an enlarged scale illustrating how the neck forming sleeve of the invention seals to the injection mold on an inner annular surface and how the shoulder forming sleeve of the invention seals to the blow mold on an outer annular surface and further showing the container neck being molded between the core and neck forming sleeve with external threads.

Referring to FIGS. 2 and 7, the injection-blow molding apparatus 10 is shown with the die set in its closed position in which preforms or parisons 58 are being formed in the injection molds 22 by plastic supplied from source 56 in FIG. 1 through the sprue system 60 in runner plate 34. At the same time, finished containers 62 are being blow molded in blow molds 20 by air supplied from source 54 in FIG. 1 to each of the blow molds 20. The details of only one injection mold 22 and one blow mold 20 are shown in FIG. 2, and these stations have been enlarged to show the detail in FIG. 7. FIG. 2 shows the plate assembly 38 shuttled to the right on ways 40 so the containers 62 are being blown in the end vertical row of blow molds 20" and parisons are being formed in the other vertical row of injection molds 22, while the other end vertical row of blow molds 20' is not being used in this cycle.

In addition to the shoulder forming sleeve plate 18 which carries the shoulder forming sleeves 30, the plate assembly 38 of the moving platen assembly 24 includes a core plate 64 holding the cores 28 and three neck forming sleeve plates 66, 68 and 70 in the embodiments of the invention shown in FIGS. 1-7.

Forward support plate 66 carries roller bearings 72 and rearward support plate 70 carries roller bearings 74 which support the neck forming sleeves 32 for rotation which is imparted through pinions 76, which are an integral part of the neck forming sleeves 32, through the movement of alternately actuated rack assemblies 48 and 50. In the position shown in FIGS. 1 and 2 rack assembly 50 would be moved downwardly moving the individual racks 82 and 84 to unthread the neck forming sleeves 32 from the blown containers 62 in the vertical row of blow molds 20 and a like row of containers 62 which have been formed in end vertical row of blow molds 20"; see FIG. 7 also. Similarly, when the plate assembly 38 has been shifted to the left so that containers 62 are being blow molded in end row cavity 20', rack assembly 48 will be lowered to move individual racks 80 and 78 to unthread the neck forming sleeves 32 from the blown finished containers 62 formed in this cycle of operation.

Figure 8:
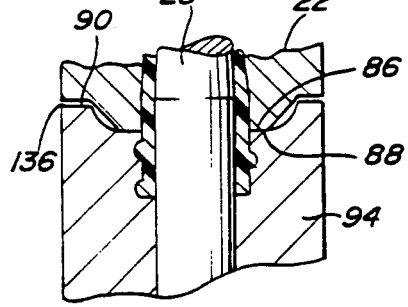
FIG. 8 is a partial top cross-sectional view of the injection molding station showing another embodiment of the invention in which a combined neck forming and shoulder forming sleeve is used with the sleeve sealing to the injection mold on an inner annular surface and further showing the container neck being molded between the combined sleeve and the core with external threads.

Referring to FIG. 7, when the moving platen assembly 24 is moved into abutment with the stationary cavity plate 12 of stationary platen assembly 112, annular face 86 of the neck forming sleeve seals against the opposed annular face 88 of injection mold 22. At the same time end face 90 of shoulder forming sleeve 30 seals against the opposing annular end face 92 of blow mold 20. When a single neck forming and shoulder forming sleeve 94 is used as shown in FIG. 8, the annular sealing surface 86 is the inner annular sealing surface of the combined sleeve 94 for sealing against the sealing face 88 of the injection mold 22, and the outer annular surface 90 of the combined sleeve will seal against the annular sealing surface 92 of the blow mold when the core 28 and sleeve 94 are moved into alignment and abutment with the blow mold 20 in the same manner as shown with the dual sleeve arrangement of FIG. 7.

Referring to FIG. 7, the poppet valve 96 of core 28 is kept in its closed position when the core is in an injection mold 22 by a force on the operating stem 98 in the direction of arrow 100. During the blowing cycle, the operating stem 98 is moved in the direction of arrow 102 to open the poppet valve 96 for air flow through passage 104 from the source 54 of blow air as shown in FIG. 1.

Since both the blow molds 20 and the injection molds 22 are circumferentially continuous or solid molds only opening axially at one end by the movement of the core and associate neck and shoulder forming sleeves, both of these molds can be temperature controlled by circular cooling passages 106 and 108 respectively. This allows very accurate and consistent control of both the parison 58 by circulation of heat transfer fluid through the passages 108 and the container 62 being blown in blow mold 20 by heat transfer fluid flowing in passages 106. The concentricity of the passages to the parison and the blow molded container allows a much more accurate and consistent control than the conventional axial type passages that must be used in injection and blow molds that are radially opened.

Upon completion of the molding cycle depicted in FIGS. 2 and 7 the injection-blow molding machine and the apparatus of this invention is opened to its fullest extent by travel of its movable core and sleeve platen assembly 24 along guideposts 16 in the direction of arrow 110 away from the stationary platen assembly 112 which includes the cavity plate 12 as shown in FIG. 3. This strips the injection molded parisons 58 and the blow molded containers 62 from their respective mold cavities 22 and 20 respectively retaining both of them within their respective shoulder forming sleeves 30 in sleeve plate 18 and neck forming sleeves 32 in sleeve plates 66, 68 and 70 and on cores 28. The shoulder forming sleeve plate 18 is held in contact with the forward bearing support sleeve plate 66 of plate assembly 38 by the locking or downward force of pushrod 114 in the direction of arrow 116.

The next step in the molding cycle, depicted in FIG. 4 is accomplished with the die set remaining in its fully open position as in the previous step by stripping the threaded necks 118 of the blown container 62 from neck forming sleeves 32 through actuation of the appropriate rack assembly 48 or 50, in the downward direction of arrow 52 in FIG. 1, moving racks 78 and 80 or 82 and 84 respectively turning the pinions 76 on the neck forming sleeves 32. The sleeves 32 are rotated in an unthreading direction while advancing the shoulder forming plate 18 at the same rate as the lead of the screw by cam elements, not shown, associated with the racks or alternatively by advance of pushrod 114 in the direction of arrow 120 in FIG. 4. The advancement of the shoulder forming plate 18 in the direction of arrow 122 causes the plate to act as a stripper plate moving the neck of the containers forward towards stationary platen assembly 112 on the respective cores 28. With the shuttling plate assembly 38 in the position shown in FIGS. 1, 2 and 4, the rack assembly 50 would be moved downward to move its associated racks 82 and 84, stripping the blown bottles.

Figure 5:
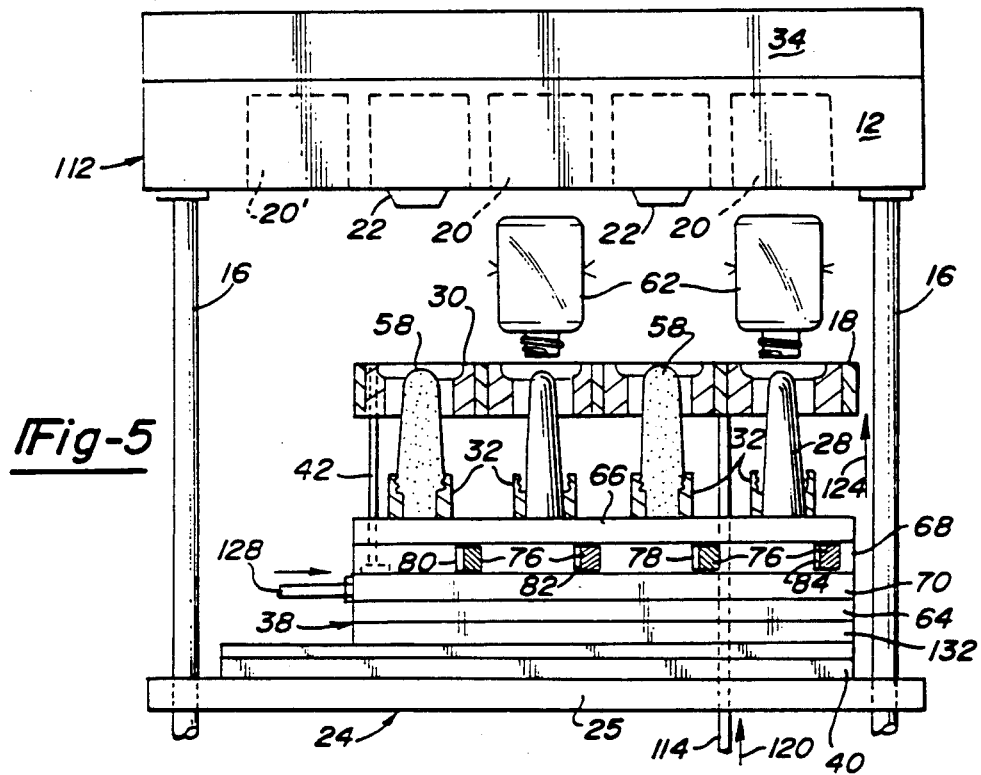
FIG. 5 is a top view similar to FIGS. 3 and 4 showing the shoulder forming plate having been advanced to its maximum extent toward the mold cavity plate having stripped the blown containers entirely from their respective cores for free fall ejection of the containers while the ends of the molded parisons are protected by remaining in the shoulder forming plate cavities.

With the completion of the unthreading of the container necks shown in FIG. 4, the shoulder forming sleeve plate 18 with its shoulder forming sleeves 30 is advanced to its fullest extent in the direction of arrow 124 as shown in FIG. 5 by the extension of pushrod 114 in the direction of arrow 120 towards the stationary platen assembly 112 pushing the completed containers 62 completely off the cores 28 free from the shoulder forming sleeves 30 for free fall ejection as shown. At the same time, the relatively soft parisons 58 are protected within their respective neck forming sleeves 32 from any contact with the ejected containers 62. The movement of the shoulder forming sleeve plate 18 as a stripper plate is along guide rods 42 as best seen in FIGS. 1 and 5.

Figure 6:
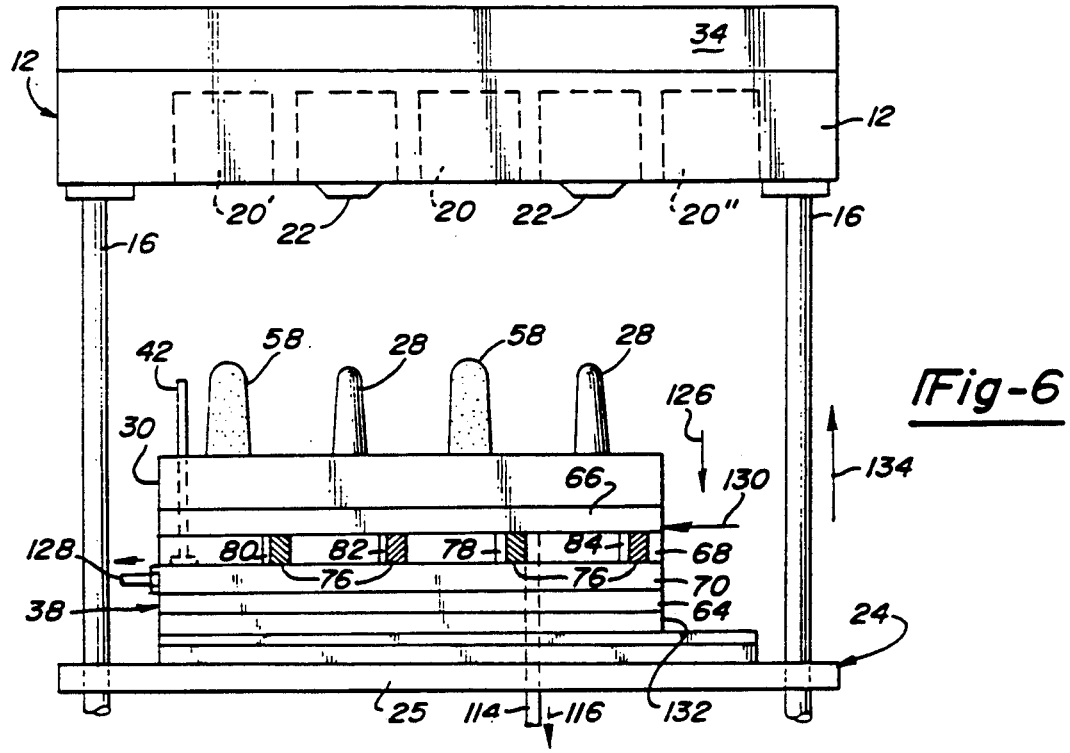
FIG. 6 is a top view similar to FIGS. 3–5 showing the shoulder forming plate having been returned to its initial position in contact with the first neck forming sleeve plate and with the cores and plates having been shuttled to the left so that the previously formed parisons will be introduced into blow molds and the stripped cores will be introduced into injection molds for the formation of new parisons upon the closing of the press to its molding position as shown in FIG. 2.

Upon the completion of the ejection step shown in FIG. 5, the shoulder forming sleeve plate 18 is returned in the direction of arrow 126 in FIG. 6 to its abutting position with the forward bearing support plate 66 by the movement of pushrod 114 in the direction of arrow 116. Next the plate assembly 38 is shifted or shuttled to the left as shown in FIG. 6 by the action of cylinder 36, shown in FIG. 1, and piston rod 128, shown in FIGS. 1 and 6, in the direction of arrow 130. The slide plate 132 moves along the ways 40 during this shuttling motion.

The plate assembly 38 is now in position for movement of platen assembly 24 in a closing direction indicated by arrow 134 to commence another molding cycle. During this next cycle, the previously formed parisons 58 would be inserted into blow molds 20 with the leftmost vertical row of parisons 58 being inserted into the blow molds 20' leaving the blow molds 20" unused during this cycle. Also the guide rods 42 will line up with alternate cavities 46 upon closure of the die set to the molding position of FIGS. 2 and 7.

Whether separate neck forming sleeves 32 and shoulder forming sleeves 30 are used as in the embodiment of FIGS. 1-6 or a unitary neck and shoulder forming sleeves 94 are used as in the embodiment of FIG. 8, the annular surface 86 on the sleeve or sleeves seals against the annular surface 88 of the injection mold while there is a gap between the annular surface 90 on the sleeve or sleeves and the injection mold 22. In the blow mold 20, the annular surface 90 seals against the annular surface 92 on the blow mold while the annular surface 86 on the sleeve or sleeves cooperates with shoulder forming sleeve 30 to form a portion 137 of the container shoulder; see FIGS. 7.

Figure 9:
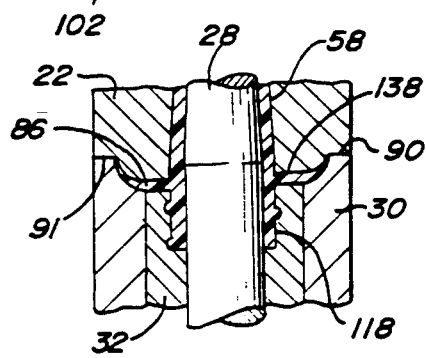
FIG. 9 is a partial top sectional view of another embodiment of the injection molding station showing a neck forming sleeve concentrically located around the core and a separate shoulder forming sleeve concentrically located around the neck forming sleeve with the shoulder forming sleeve sealing to the injection mold on an outer annular surface with the neck being formed between the core and neck forming sleeve with external threads and showing an outer shoulder portion being formed by cooperation between the faces of the neck forming sleeve and the shoulder forming sleeve with the injection mold.
Figure 10:
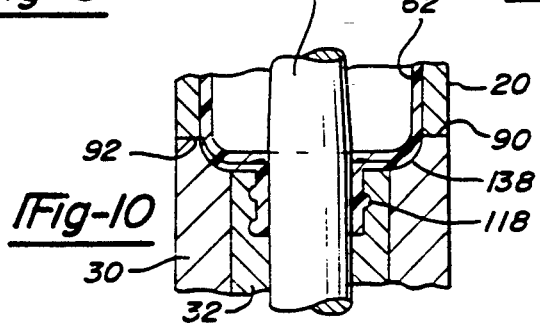
FIG. 10 is a partial top sectional view of a blow mold showing the formation of a container shoulder with the outside shoulder portion formed in the injection mold of FIG. 9 and showing the shoulder forming sleeve sealing to the blow mold on the same outer annular surface.

In the embodiment of FIG. 9 showing an injection molding station, in addition to the closure attachment means which is shown as a threaded neck 118 being molded on parison 58, an outside shoulder portion 138 is simultaneously molded between the inner sealing face 86 at the end of the neck forming sleeve 32 and a portion of the shoulder forming sleeve 30 with the injection mold 22. In this embodiment a single annular sealing surface 90 on the shoulder forming sleeve 30 seals against an opposing annular surface 91 on the injection mold 22, and as shown in FIG. 10, the same sealing surface 90 seals against a like opposing annular surface 92 on the blow mold 20. When parison 58 with its outside shoulder portion 138 is introduced into the blow mold 20, the outside shoulder surface 138 acts as a molding surface to form the completed shoulder of the container. This has the advantage of using a single sealing surface 90 on the shoulder forming sleeve 30 for sealing both to the injection mold 22 and the blow mold 20.

In FIGS. 11 and 12 a portion of the injection molding station and blow molding station respectively is shown utilizing a neck forming sleeve 32 and shoulder forming sleeve 30 with the same sealing surfaces as shown in FIG. 7 or the embodiments of FIGS. 1-7 but with the core and sleeves configured to mold a container neck with a closure attachment means and a radially offset structure in the form of a drain back neck 180 formed between the shoulder forming sleeve 30 and the neck forming sleeve 32 with internal threads 182 formed by the neck forming sleeve 32 and a pour spout 184 formed with an oblique opening 186 between a recess 188 in the core 28 and the neck forming sleeve 32.

In the embodiments of FIGS. 1-12, the separate neck forming sleeve and shoulder forming sleeve have both been constructed with a circumferentially continuous wall so that there are no mold marks or parting lines on the container shoulder or the threaded neck of the container. Also, the unitary neck and shoulder forming sleeve 94 of FIG. 8 is circumferentially continuous. This requires the unthreading of the neck forming sleeve by the rack and pinion mechanism shown in FIGS. 1, 2 and 7 unless a very shallow jump thread is acceptable for the part being molded. In some instances it is either undesirable or impossible to unthread the container neck. For example, if the closure attachment means takes the form of a snap bead, this is a continuous flange on the container neck which cannot be unthreaded. In other instances parting lines on the neck thread are acceptable so that in either instance a neck forming sleeve can take the form of a multiple element device or chuck having two or more annular sectors or jaws and a camming sleeve or structure which alternately keeps the jaws together in a contiguous molding position or in a separated position in which the jaws move radially outward to release the closure attachment means on the neck of the container.

Figure 13:
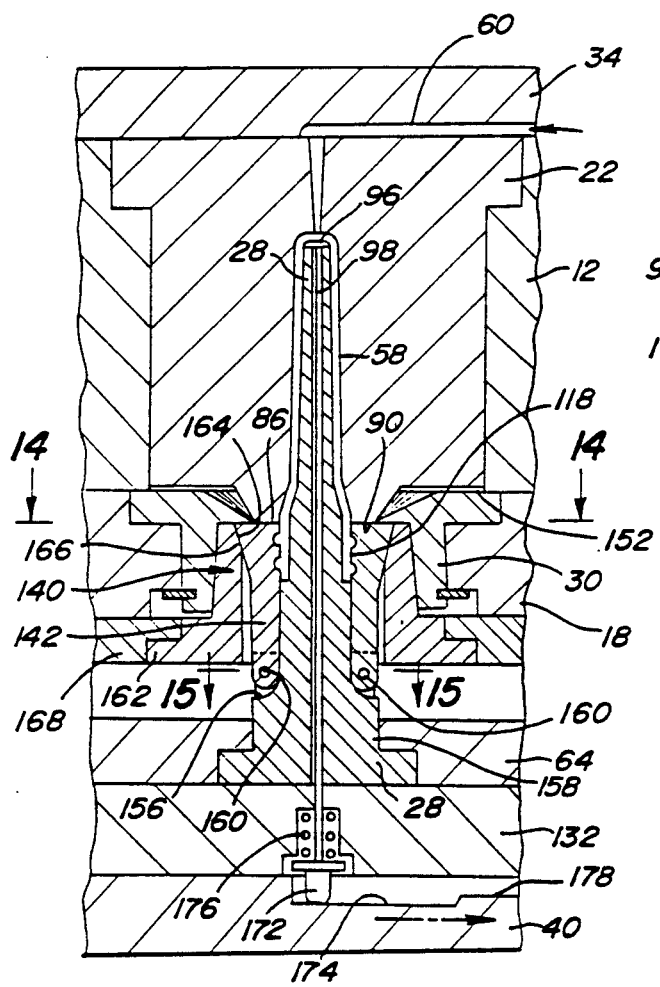
FIG. 13 is a partial top cross-sectional view similar to FIG. 7 but showing only a single injection molding station on an enlarged scale to illustrate another embodiment of the invention in which the neck forming sleeve and shoulder forming sleeve are separate and the neck forming sleeve includes four annular sectors which are arranged to move outwardly when the finished container is being readied for ejection.
Figure 14:
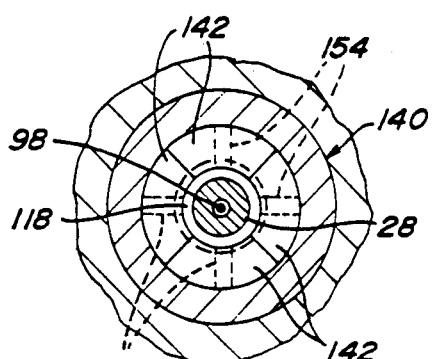
FIG. 14 is a cross-sectional view taken along line 14—14 in FIG. 13.
Figure 15:
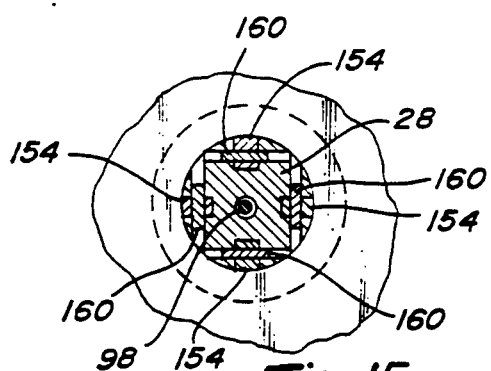
FIG. 15 is a cross-sectional view taken along line 15—15 of FIG. 13.
Figure 18:
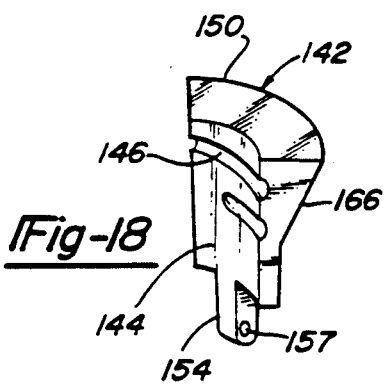
FIG. 18 is a perspective view of one of the four annular sectors or jaws of the neck forming sleeve of the invention shown in FIGS. 13–17 for forming a closure attachment means as a helical thread.
Figure 19:
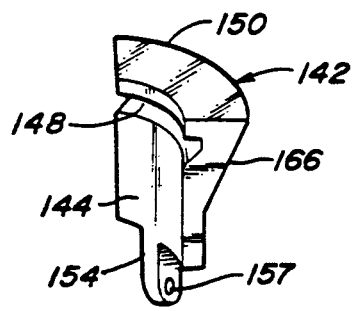
FIG. 19 is a perspective view similar to FIG. 18 showing another embodiment of the invention utilizing four jaw members as part of the neck forming sleeve to form a snap bead closure attachment means on the neck of a container.
Figure 16:
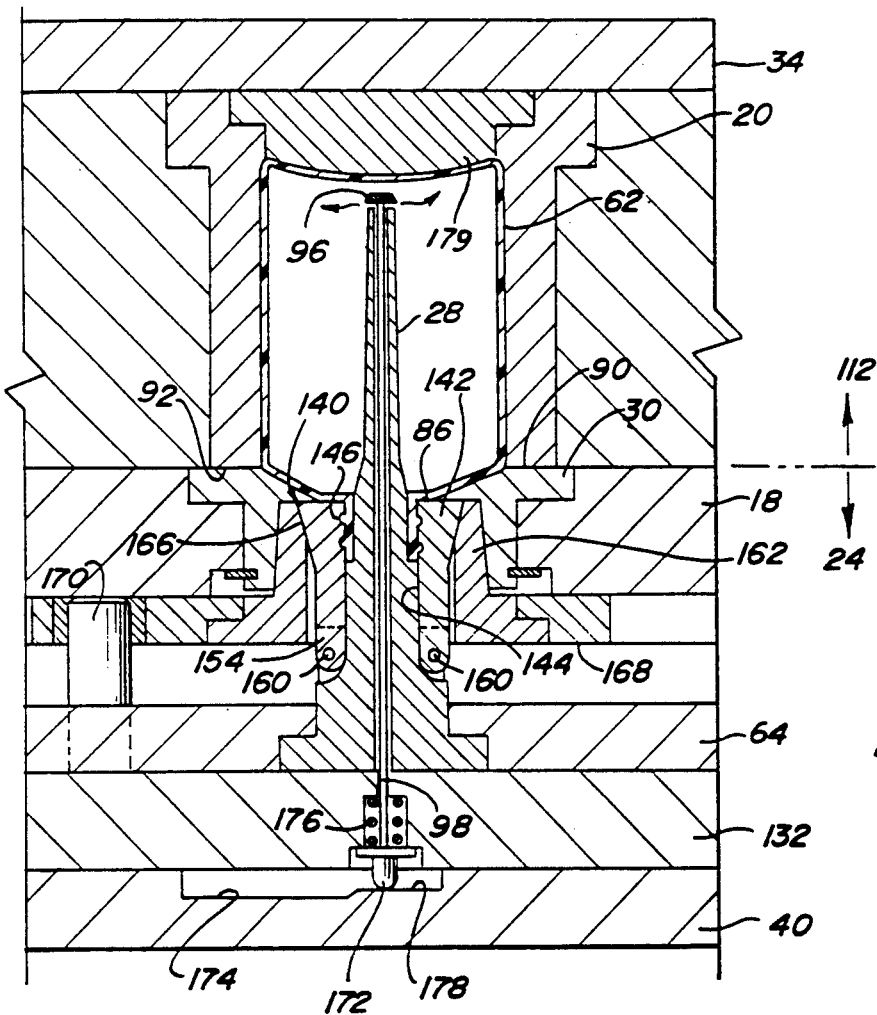
FIG. 16 is an enlarged view similar to FIG. 13 of the embodiment of the invention in FIG. 13 showing the blow molding station and the coaction of the multiple component neck forming sleeve and the circumferentially continuous shoulder forming sleeve with a blow mold.
Figure 17:
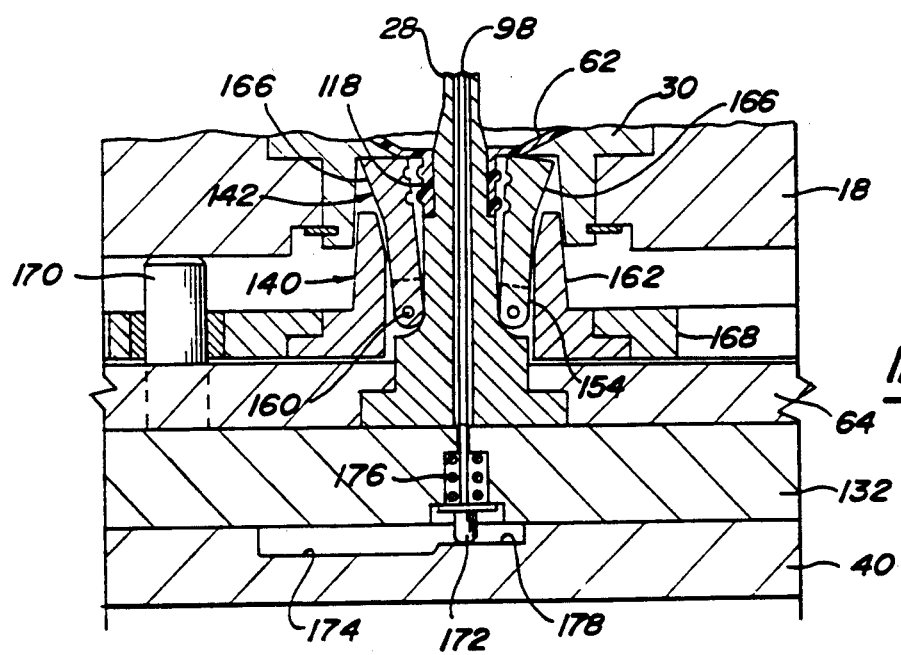
FIG. 17 is a partial top cross-sectional view similar to FIG. 16 showing the embodiments of FIGS. 13–15 with the annular sectors in their open position to allow ejection of the completed blow molded container.

Referring to FIGS. 13-19, the molding apparatus of the invention includes a separate shoulder forming sleeve 30 and a separate neck forming sleeve 140 having four contiguous annular sectors or jaws 142 which form the neck with its closure attachment means when the jaws or sectors are in a closed position. The annular sectors or jaws are movable outwardly for ejection of the container. FIG. 13 shows this neck forming sleeve or four jaw-neck forming chuck in its closed molding position with a portion of the end faces 150 of the individual jaw 142, see FIG. 18, sealed at 86 against the injection mold 22 forming parison 58 with a threaded neck 118. FIG. 16 shows neck forming chuck 140 with its jaws 142 still being held in their closed contiguous relationship with a portion of the end faces 150 sealing to the blow mold and a portion forming a portion of the shoulder of blow molded container 62. FIG. 17 shows the neck forming chuck 140 in its open position with the jaws 142 pivoted to release the container neck. FIG. 18 shows one of the four jaws or sectors 142 of the neck forming chuck 140. The inner cylindrical surface 144 forms the neck of the container with the groove 146 forming the threads on the container neck. Alternately as shown in FIG. 19 the closure attachment means can take the form of a snap bead formed by the groove 148.

Referring to FIG. 13, the inner portion 86 of radial face 150 acts as a sealing face 86 which seals against the annular sealing area 88 in the injection mold in the same manner as the seal effected by neck forming sleeve 32 and injection mold 22 in FIG. 7. A clearance space 152 is provided between the shoulder forming sleeve 30 and the injection mold 22 from the outer extremity of the sealing surface 86 on the jaw face 150. The lower end of jaw 142 is formed with a tang 154 which fits within a recess 156 in the lower portion 158 of the core 28. The tang 154 has an aperture 157 close to its end to receive a pin 160 for pivotal mounting of the jaws to the core, as best shown in FIG. 15. Chuck retainer sleeve 162 surrounds the jaws 142 having a tapered inner surface 164 at one end which coacts with the outer tapered surface 166 on the jaws to retain the jaws in their closed contiguous position when the sleeve is in its forward position as shown in FIGS. 13 and 16 being held there by its associated actuating bar 168. The actuating bar 168 is movable from its closing position shown in FIGS. 13 and 16 to its opening position shown in FIG. 17 on guide rods 170 one of which is shown in FIGS. 16 and 17.

FIG. 16 shows the core 28, neck forming chuck 140 and shoulder forming sleeve 30 in operative position with blow mold 20. Sealing to the mold is effected between the outer annular surface 90 on the shoulder forming sleeve 30 and sealing face 92 of the blow mold. The container shoulder is formed against the inner surface 86 of the jaw faces 150 and the molding surface of the shoulder forming sleeve 30. When the container 62 has been blown, the actuating bars 168 associated with the blow molds, are moved to a rearward position as shown in FIG. 17 carrying the chuck retainer sleeves with it to release the jaws 142 for pivotal outward movement releasing the threaded neck portion 118 of the finished container 62.

Also shown in FIGS. 13, 16 and 17 is the actuating mechanism for the core poppet valve 96. The valve operating stem 98 has a cam follower 172 at its free end which rides in the cam track 174 in plate 40. Spring 176 maintains the poppet valve 96 in its closed position in the injection mold 22 as shown in FIG. 13. When the core is moved into the blow mold 20 as shown in FIG. 16, the cam follower 172 rides against raised cam surface 178 opening the poppet valve 96 against the force of spring 176 as shown in FIG. 16 for admitting the blow air into the parison to form the container 62.

FIG. 16 shows the circumferentially continuous blow mold 20 sealed at its rearward end by bottom forming plug 178 for ease in manufacturing the mold.

We claim:

1. Injection-blow molding apparatus for forming containers with restricted necks comprising, in combination:

a one-piece circumferentially continuous injection mold open at one end having a longitudinally extending axis;

a one-piece circumferentially continuous blow mold adjacent said injection mold, said blow mold having an open end and a longitudinally extending axis;

a core having a longitudinally extending axis alternately aligned with the axes of said injection and blow molds and mounted for relative movement between and into and out of said injection and blow molds along their respective longitudinally extending axes between an open and a closed position;

a neck forming sleeve concentrically located around said core;

a circumferentially continuous shoulder forming sleeve concentrically located around said neck forming sleeve;

positioning means for moving said core and said neck and shoulder forming sleeves between said open and closed positions relative to said molds to form a parison in said injection mold and blow a container from a previously formed parison in said blow mold; and separating means for ejecting a finished container from said blow mold, core and neck and shoulder forming sleeves in a direction parallel to said core before the core and sleeves are moved relative to said injection mold to form another parison.

2. The apparatus according to claim 1 wherein said neck forming sleeve and said shoulder forming sleeve is a single circumferentially and radially continuous combined neck and shoulder forming sleeve concentrically located around said core.

3. Injection-blow molding apparatus for forming containers with restricted necks comprising, in combination:

a series of at least two one-piece circumferentially continuous blow molds and a one-piece circumferentially continuous injection mold between said blow molds, each of said injection and blow molds being open at one end and having a longitudinally extending axis;

a series of cores, each core having a longitudinally extending axis alternately aligned with the axes of said injection mold and one of said at least two blow molds, each core being mounted for relative movement into and out of said injection mold and blow molds along their respective longitudinally extending axes between a closed and an open position;

a series of neck forming sleeves concentrically located around said cores;

a series of circumferentially continuous shoulder forming sleeves concentrically located around said neck forming sleeves;

positioning means for moving said cores and said neck and shoulder forming sleeves between said open and closed positions relative to said molds to form a parison in said injection mold and blow a container from a previously formed parison on one of said cores in one of said blow molds; and separating means for ejecting a finished container from said one blow mold, core and neck and shoulder forming sleeves in a direction parallel to said core before the core and sleeves are moved relative to said injection mold to form another parison while a container is being blown in the other of said blow molds.

4. The apparatus according to claim 3 wherein said positioning means moves one of said series of blow molds or said series of cores and sleeves and the other of said series of blow molds or series or cores and sleeves is stationary.

5. The apparatus according to claim 3 wherein said positioning means locates one of said cores and neck and shoulder forming sleeves with a parison thereon in the blow mold on one side of said injection mold during one molding cycle and locates another of said cores and said neck and shoulder forming sleeves with a parison thereon in the blow mold on an opposite side of said injection mold during the next successive molding cycle.

6. The apparatus according to claim 3 wherein each of said neck forming sleeves is configured to form a neck with closure attachment means on said parison when one of said cores and said neck forming sleeves are in said closed position relative to said injection mold, said closure attachment means providing a surface upon which a cap may be secured.

7. The apparatus according to claim 6 wherein each of said neck forming sleeves is configured to form said closure attachment means as threads on said neck.

8. The apparatus according to claim 7 wherein said separating means for ejecting a finished container includes means for unthreading said container from said neck forming sleeve.

9. The apparatus according to claim 6 wherein each of said shoulder forming sleeves is configured so that said container is blown with a shoulder when a core and a neck and a shoulder forming sleeve with a previously formed parison on said core is located in said closed position relative to one of said blow molds.

10. The apparatus according to claim 9 wherein each of said series of neck forming sleeves has an inner annular clamping surface which is clamped against said injection mold when said cores and neck and shoulder forming sleeves are in said closed position relative to said injection mold, and each of said series of shoulder forming sleeves has an outer annular clamping surface which is clamped against one of said blow molds when said cores and neck and shoulder forming sleeves are in said closed position relative to one of said blow molds.

11. The apparatus according to claim 3 wherein said neck and shoulder forming sleeves are configured to form a neck with closure attachment means and an outside container shoulder portion on said parison when one of said cores and sleeves are in said closed position relative to said injection mold and said container is blown with said outside shoulder portion acting as a molding surface when said one of said cores and said sleeves with said parison on said one of said cores are in said closed position relative to one of said blow molds, said closure attachment means providing a surface upon which a cap may be secured.

12. The apparatus according to claim 11 wherein said series of neck forming sleeves and said series of shoulder forming sleeves are a single series of circumferentially and radially continuous combined neck and shoulder forming sleeves located concentrically around said cores.

13. The apparatus according to claim 12 wherein a single annular clamping surface on each of said combined neck and shoulder forming sleeves of said series of combined neck and shoulder forming sleeves clamps against said injection mold when one of said cores and sleeves are in said closed position relative to said injection mold, and said single annular clamping surface clamps against one of said blow molds when one of said cores and sleeves are in said closed position relative to one of said blow molds.

14. The apparatus according to claim 3 wherein said series of neck forming sleeves includes a separate series of neck forming sleeves concentrically located around said cores and said series of shoulder forming sleeves includes a separate series of shoulder forming sleeves concentrically located around said neck forming sleeves.

15. The apparatus according to claim 14 wherein each of said shoulder forming sleeves form a shoulder on said container in one of said injection or blow molds and acts as a stripper element when said container is being ejected from said blow mold.

16. The apparatus according to claim 14 wherein said neck forming sleeves are circumferentially continuous.

17. The apparatus according to claim 14 wherein each of said neck forming sleeves has an annular clamping surface which is clamped against said injection mold when one of said cores and said neck forming sleeves is in said closed position relative to said injection mold, and each of said shoulder forming sleeves has an annular clamping surface which is clamped against one of said blow molds when one of said cores and said shoulder forming sleeves is in said closed position relative to one of said blow molds.

18. The apparatus according to claim 14 wherein each of said shoulder forming sleeves has an annular clamping surface which is clamped against said injection mold when said core and said shoulder forming sleeves are in said closed position relative to said injection mold, and said annular clamping surface is clamped against one of said blow molds when said core and shoulder forming sleeves are in said closed position relative to one of said blow molds.

19. The apparatus according to claim 14 wherein each of said neck forming sleeves and each of said shoulder forming sleeves are configured to mold a container neck with closure attachment means and a radially offset structure when said one of said cores and one of said neck forming and shoulder forming sleeves are in said closed position relative to said injection mold, said closure attachment means providing a surface upon which a cap may be secured.

20. The apparatus according to claim 19 wherein each of said neck forming sleeves and each of said shoulder forming sleeves are configured to mold a container neck with a pour spout and internal threads as said radially offset structure and closure attachment means.

21. The apparatus according to claim 14 wherein each of said neck forming sleeves includes a plurality of contiguous annular sectors which form said closure attachment means on said container neck when one of said cores and neck forming sleeves is in said closed position relative to said injection mold, said annular sectors being movable outwardly when said finished container is being ejected.

22. The apparatus according to claim 21 wherein the annular sectors of each of said neck forming sleeves are configured to form an external thread on said container neck.

23. The apparatus according to claim 21 wherein the annular sectors of each of said neck forming sleeves are configured to form a snap bead on said container neck.

24. Injection-blow molding apparatus for forming a container having a neck with closure attachment means and a structure radially offset from said neck comprising, in combination:
- a series of at least two one-piece circumferentially continuous blow molds, each blow mold being open at one end and having a longitudinally extending axis;
- a one-piece circumferentially continuous injection mold between said blow molds, said injection mold having an open end and a longitudinally extending axis;
- a series of cores, each core having a longitudinally extending axis mounted for relative reciprocating movement into and out of said injection mold and blow molds along their respective longitudinally extending axes between a closed and an open position for forming a parison in the injection mold and blowing said parison into a container in one of said blow molds;
- a series of neck forming sleeves concentrically located around said cores;
- a series of circumferentially continuous shoulder forming sleeves concentrically located around said neck forming sleeves;
- positioning means for moving said cores and said sleeves between said open and closed positions relative to said molds to form said parison in said injection mold, said parison having a body portion, a neck having said closure attachment means and a radially offset structure formed by coaction of said injection mold, said cores, said neck forming sleeves and said shoulder forming sleeves;
- transfer means for moving said cores with said neck forming sleeves, shoulder forming sleeves, and said parison in a direction transverse to the axes of said cores for alignment of the longitudinally extending axes of said core with the longitudinally extending axes of one of said blow molds;
- said positioning means moving said cores with said neck forming sleeves, shoulder forming sleeves and said parison from said open to said closed position of said one of said blow molds for forming said container with a shoulder portion; and
- separating means for ejecting a finished container from said blow molds, said neck forming sleeves, said shoulder forming sleeves and said cores moving in a direction parallel to the longitudinally extending axes of said cores before said cores and sleeves are moved by said transfer means in an opposite transverse direction relative to said injection mold to form another parison, said closure attachment means providing a surface upon which a cap may be secured.

25. Injection-blow molding apparatus for forming containers with restricted neck comprising, in combination:
- a set of adjacent alternately arranged one-piece circumferentially continuous blow molds and one-piece circumferentially continuous injection molds, each of said injection and blow molds being open at one end and having a longitudinally extending axis;
- a plurality of cores, each core having a longitudinally extending axis mounted for relative reciprocating movement into and out of said injection molds and blow molds along their respective longitudinally extending axes between an open and closed position;
- a plurality of neck forming sleeves concentrically located around each of said cores;
- a plurality of circumferentially continuous shoulder forming sleeves concentrically located around each of said neck forming sleeves;
- positioning means for moving said cores and said neck and shoulder forming sleeves between said open and closed positions relative to said injection molds to form parisons in said injection molds and for blowing containers from said parisons on said cores in said blow molds; and
- separating means for ejecting finished containers from said blow molds and moving said cores and neck and shoulder forming sleeves in a direction parallel to the longitudinally extending axes of said cores.

26. The apparatus according to claim 25 wherein each of said neck forming sleeves is configured to form a neck with closure attachment means on each parison when said cores and neck forming sleeves are in said closed position relative to said injection molds, said closure attachment means providing a surface upon which a cap may be secured.

27. The apparatus according to claim 26 wherein each of said neck forming sleeves includes a separate neck forming sleeve concentrically located around one of said cores and each of said shoulder forming sleeves includes a separated shoulder forming sleeve concentrically located around one of said neck forming sleeves.

28. The apparatus according to claim 27 wherein each of said neck forming sleeves and each of said shoulder forming sleeves are configured to mold a container neck with closure means and a radially offset structure when said cores are in said closed position relative to said injection molds, said closure attachment means providing a surface upon which a cap may be secured.

29. The apparatus of claim 25 wherein said set includes a horizontal row of adjacent alternately arranged one-piece circumferentially continuous blow molds and one-piece circumferentially continuous pre-form injection molds.

30. The apparatus of claim 29 wherein said horizontal row begins and ends with a blow mold so that there is one more blow mold than injection molds.

31. The apparatus of claim 29 including a plurality of vertically spaced horizontal rows of adjacent alternately arranged one-piece circumferentially continuous blow molds and one-piece circumferentially continuous pre-form injection molds.

32. Injection-blow molding apparatus for forming containers with restricted necks, comprising, in combination:
- a series of one-piece circumferentially continuous blow molds and a one-piece circumferentially continuous injection mold between each of said blow molds, each of said injection and blow molds being open at one end and having a longitudinally extending axes;
- a series of cores, each core having a longitudinally extending axis mounted for relative movement into and out of said injection and blow molds along their respective longitudinally extending axes between an open and a closed position;
- a series of neck forming sleeves concentrically located around said cores;
- a series of circumferentially continuous shoulder forming sleeves concentrically located around said neck forming sleeves;
- positioning means for moving said cores and said neck and shoulder forming sleeves between said open and closed positions relative to said molds to form a parison in each injection mold and for blowing a container from a previously formed parison in each blow mold; and
- separating means for ejecting a finished container from each blow mold, while moving said cores and neck and shoulder forming sleeves in a direction parallel to said axes of said cores before the cores and sleeves are moved relative to each injection mold to form another parison while a container is being blown in each blow mold.

33. A die set for use in injection-blow molding apparatus for forming containers with restricted necks comprising, in combination:
- an array of one-piece circumferentially continuous blow molds and a one-piece circumferentially continuous injection mold, between each of said blow molds each of said injection and blow molds being open at one end and having a longitudinally extending axis;
- an array of cores, each core having a longitudinally extending axis mounted for relative movement into and out of said injection mold and blow molds along their respective longitudinally extending axes between an open and a closed position;
- a plurality of neck forming sleeves concentrically located around said cores;
- a plurality of circumferentially continuous shoulder forming sleeves concentrically located around said neck forming sleeves;
- positioning means for moving said cores and said neck and shoulder forming sleeves between said open and closed positions relative to said molds to form a parison in each injection mold and for blowing a container from a previously formed parison in each blow mold; and
- separating means for ejecting a finished container from each blow mold, moving said cores and neck and shoulder forming sleeves in a direction parallel to said axes of said cores before the cores and sleeves are moved relative to each injection mold to form another parison while a container is being blown in each blow mold.

34. The die set according to claim 33 wherein said array of molds is stationary, said array of molds constituting a stationary portion of said die set and said array of cores and concentrically located neck and shoulder forming sleeves are moved into and out of said molds between said open and closed positions and moved transverse to the axes of said cores between said injection and blow molds to constitute a moving portion of said die set.

35. The die set according to claim 34 wherein each of said plurality of neck forming sleeves includes a separate neck forming sleeve concentrically located around each of said cores and each of said plurality of shoulder forming sleeves includes a separate shoulder forming sleeve concentrically located around each of said neck forming sleeves.

36. The apparatus according to claim 34 wherein each of said plurality of neck forming sleeves and each of said shoulder forming sleeves is a single circumferentially and radially continuous combined neck and shoulder forming sleeve located around said each of said cores.

* * * * *